UNITED STATES PATENT OFFICE.

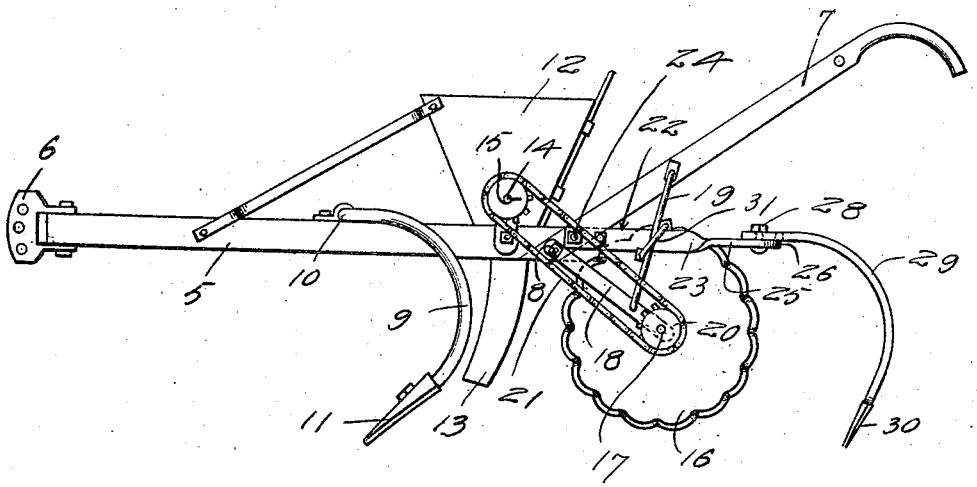

JAMES W. CARTER, OF MINDEN, LOUISIANA.

AGRICULTURAL IMPLEMENT.

1,414,931.  Specification of Letters Patent.  Patented May 2, 1922.

Application filed August 6, 1919. Serial No. 315,726.

*To all whom it may concern:*

Be it known that I, JAMES W. CARTER, a citizen of the United States, residing at Minden, in the county of Webster and State of Louisiana, have invented certain new and useful Improvements in Agricultural Implements; and I do hereby declare the following to be a full, clear, and exact description of the invention, such as will enable others skilled in the art to which it appertains to make and use the same.

My invention relates to improvements in agricultural implements and more particularly to fertilizer distributors.

An important object of this invention is to provide an agricultural implement of the character described having novel means for integrating the material dispensed with the soil.

A further object of this invention is to provide an agricultural implement of the character described which is simple, few in parts, and cheap to manufacture.

Other objects and advantages of the invention will be apparent during the course of the following description.

In the accompanying drawing forming a part of this application and in which like numerals are employed to designate like parts throughout the same, Figure 1 is a side elevation of an apparatus embodied in my invention, Figure 2 is a rear end elevation of the same, Figure 3 is a plan view of one of the pulverizing teeth, and, Figure 4 is a plan view of a support for the pulverizing teeth.

In the drawing wherein for the purpose of illustration is shown a preferred embodiment of my invention, the numeral 5 designates a plow beam having an attaching member 6 attached to its forward end. A pair of guide or handle bars 7 extend rearwardly from the beam 6 and are attached to the same by a transversely extending bolt 8. A plow stock 9 is secured to the beam as indicated as at 10 and is provided with a plow bottom 11 adapted for contact with the ground for opening up a furrow. A hopper 12 is carried by the beam and is provided with a discharge spout 13 arranged rearwardly of the stock 9. A socket 14 is arranged on the shaft 15 of a dispensing mechanism (not shown) of the hopper. The hopper, as is usual, dispenses the material within the same at predetermined intervals. A ground contact roller 16 is mounted on an axle 17 connected to rearwardly inclined supports 18. The upper end portions of the supports 18 are connected to the bolts 8. The lower end portions of the braces or supports 18 are connected to upwardly extending braces 19 having their upper ends connected to the handle 7. A sprocket 20 is mounted on the shaft 17 and is connected to the socket 14 by a chain 21.

A bracket generally designated by the numeral 22 is provided with a pair of parallel arms 23 and having their forward end portions apertured for the reception of attaching bolts 24. The rear end portions of the arms 23 diverge outwardly as indicated at 25 and are connected by a transversely extending bar 26 having a plurality of spaced openings 27 receiving bolts 28 attaching a plurality of pulverizing teeth 29 to the transversely extending member 26. The pulverizing teeth 29 are each provided with a plurality of attaching openings whereby the relation of the teeth to the wheel 16 may be varied at will. The pulverizing teeth are provided with ground engaging points 30.

The parallel portions of the arms 23 are connected to the upwardly inclined braces 19 by U-shaped cuffs 31 which surround the arms 23 and the adjacent portions of the braces 19 and thereby serve to rigidly support the bracket 22.

In the use of my invention the material is dispensed from the hopper 12 and discharged in the furrow provided by the member 11. The teeth 29 serve to pulverize and integrate the material dispensed from the hopper with the adjacent soil.

While I have shown and described the preferred embodiment of my invention, it is understood that such minor changes in arrangement and construction of parts may be made as will remain within the spirit of the invention and the scope of the appended claim.

Having thus described my invention, what I claim is:—

An implement of the class described comprising a frame, a handle bar, a bolt securing said handle bar to the frame, a roller, a support for said roller through which said bolt passes, a brace extending from said bar to said support, soil treating means extending from the frame and crossed by said brace, and a clamp bracket engaging said brace and said soil treating means.

In testimony whereof I affix my signature in presence of two witnesses.

JAMES W. CARTER.

Witnesses:
U. O. ASHBY,
LOLA M. RICHARDSON.